US012528173B2

(12) United States Patent
Schölin et al.

(10) Patent No.: US 12,528,173 B2
(45) Date of Patent: Jan. 20, 2026

(54) POWER TOOL AND ADAPTER ASSEMBLY FOR A POWER TOOL

(71) Applicant: ATLAS COPCO INDUSTRIAL TECHNIQUE AB, Stockholm (SE)

(72) Inventors: Mattias Schölin, Stockholm (SE); Karl-Johan Nyberg, Huddinge (SE); Johan Bjurkull, Ingarö (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 0 days.

(21) Appl. No.: 18/973,333

(22) Filed: Dec. 9, 2024

(65) Prior Publication Data

US 2025/0205867 A1 Jun. 26, 2025

(30) Foreign Application Priority Data

Dec. 21, 2023 (DE) ........................ 202023107578.9

(51) Int. Cl.
*B25F 3/00* (2006.01)
*B25F 5/02* (2006.01)

(52) U.S. Cl.
CPC . *B25F 3/00* (2013.01); *B25F 5/02* (2013.01)

(58) Field of Classification Search
CPC ..... B25B 23/0028; B25B 21/002; B23C 1/10; B25F 3/00; B25F 5/02
See application file for complete search history.

(56) References Cited

U.S. PATENT DOCUMENTS

| | | | | |
|---|---|---|---|---|
| 4,617,844 A * | 10/1986 | Batten | B25B 23/0035 81/436 |
| 7,165,920 B2 | 1/2007 | Baber | |
| 11,772,242 B1 * | 10/2023 | Andersson | B25B 23/0021 81/52 |
| 12,318,892 B2 * | 6/2025 | Folke | B25B 23/0007 |
| 2013/0180364 A1 * | 7/2013 | Galat | B25B 23/0085 81/56 |
| 2022/0032439 A1 | 2/2022 | Numata | |

FOREIGN PATENT DOCUMENTS

CN 203600197 U 5/2014

* cited by examiner

*Primary Examiner* — Michelle Lopez
(74) *Attorney, Agent, or Firm* — Moore & Van Allen PLLC; W. Kevin Ransom

(57) ABSTRACT

The present specification relates to a power tool comprising a housing comprising a connection structure allowing for connecting a tool attachment and comprising a first thread, and an adapter assembly for connecting the power tool and the attachment comprising an intermediate member comprising an engaging structure for engaging the attachment and a cap nut for locking the intermediate member to the tool housing comprising a second thread for cooperating with the first thread, wherein the connection structure further comprises a wherein the intermediate member further comprises at least one fin adapted to be received in the groove, and wherein the groove extends in a manner intersecting the first thread such that the groove forms a longitudinally extending gap in the thread. The present specification also relates to an adapter assembly.

21 Claims, 3 Drawing Sheets

POWER TOOL AND ADAPTER ASSEMBLY FOR A POWER TOOL

CROSS-REFERENCE TO RELATED APPLICATIONS

This application claims priority to German Utility Model Application No. DE202023107578.9 filed 21 Dec. 2023 of the same title; the contents of which are hereby incorporated by reference.

TECHNICAL FIELD

The present invention generally relates to power tools, more particularly to housings of power tools comprising connecting structures for attaching tool attachment.

TECHNICAL BACKGROUND

Power tools, for example tightening tools used for tightening of threaded fasteners are known to be used in various industries. Commonly, some or most parts of such tools are made of metal, e.g. steel. One component commonly made of metal for tool for industrial applications is the housing.

Such materials are known for being strong and durable but in order to for example reduce the weight of the tools, attempts have been made to provide lighter housings for industrial power tools, such as housings made from various plastics or polymers or the like.

However, problems arising using lighter materials include that such housing tend to have a lower strength and be less durable. Lower strength and/or durability may be particularly severe for parts of the housing experiencing high stress levels, including for example connection structures for attaching tool attachments such as extensions, gear units and crowfoot attachments to the tool.

Known solutions for improving the durability involve using additional fastening means for fastening such tool attachments to the tool housing, such as additional screws screwed via the attachment into the housing or in the case of an attachment having a threaded connection structure to fill the joint with glue.

Problems of such known solutions however include making disassembly impossible or at least very difficult and/or the causing of permanent damage to the housing near the connection structure.

Hence, there exists a need for improvement in the field of power tool housing and solution for attaching tool attachments.

SUMMARY OF THE INVENTION

Accordingly, it would be desirable to provide an improved solution for power tool housings and connection structures for attaching power tool attachments to a power tool. In particular, it would be desirable to provide such a power tool which allows for re- or disassembly of the connection with reduced risk of damage. To better address one or more of these concerns a power tool, an adapter assembly and a kit as defined in the independent claims are provided. Preferred embodiments are defined in the dependent claims.

According to a first aspect of the invention a power tool is provided, the power tool comprising a housing that at least partly houses a motor and an output shaft drivingly connected to the motor, the output shaft extending in a first axial direction, the housing comprising a connection structure allowing for connecting a tool attachment adapted to be driven by the output shaft to the power tool, the connection structure being arranged at a front end of the housing and comprising a first thread, the power tool further comprising an adapter assembly adapted to be removably attached to the connection structure for connecting the power tool and the tool attachment, the adapter assembly comprising an intermediate member, the intermediate member comprising an engaging structure for engaging the tool attachment, the engaging structure being provided on an outer side thereof; and a cap nut for locking the intermediate member to the tool housing, the cap nut comprising a second thread for cooperating with the first thread provided at the front end of the housing, wherein the connection structure further comprises a groove extending in a longitudinal direction parallel to the direction A-A, wherein the intermediate member further comprises at least one fin adapted to be received in the groove, and wherein the groove extends in a manner intersecting the first thread such that the groove forms a longitudinally extending gap in the thread.

According to the first aspect, power tool provides an inventive solution to the concerns described above by means of a design incorporating a connecting structure provided on the housing and a cooperating adapter assembly. More particularly, by providing the connection structure on the tool housing with axially extending grooves, and the adapter assembly with axially extending fins, reaction torque may be efficiently transferred to the housing without imposing undue strain on the thread of the connection structure. Hereby, less constraints are put on the design of the thread and housing, allowing for example for the use of lighter materials, without compromising durability and strength of the connection structure. The inventive design of the power tool housing and adapter assembly according to independent claim 1 cleverly provides for easy and securely fitting attachments to a power tool in a manner allowing for repeated dis- and reassembly.

In some embodiments, the at least one fin may be described as extending in a longitudinal direction parallel to the direction A-A. The at least one fin may be described as adapted to be received in the groove to transfer torque.

In one embodiment, the first thread and/or the at least one groove is/are formed in the housing. The first thread and/or the at least one groove may be formed in an outer surface of the housing.

According to one embodiment, the intermediate member comprises a cylindrical portion, wherein the at least one fin extends on an inner side of the cylindrical outer portion, such that a gap is formed between the cylindrical portion and at least a portion of the at least one fin.

In one embodiment, the fin comprises a first axially extending portion and a second radially extending portion, the radially extending portion connecting the axially extending portion and the and cylindrical portion of the intermediate member.

According to one embodiment, the cap nut is adapted to, in use, be arranged in the gap. Hereby, an advantageously compact design may be achieved.

According to one embodiment, the connection structure is arranged to extend at least partly around a front opening provided at the front end of the housing, through which the output shaft extends.

According to one embodiment, the connection structure comprises two grooves or three grooves. According to one embodiment, the connection structure comprises four grooves. In some embodiments, the grooves may be equally spaced along a circumference of the connection structure.

According to one embodiment, the number of fins of the intermediate member equals the number of grooves of the connection structure.

According to one embodiment, the housing is a molded or casted housing comprising a first and a second half, and wherein the at least one groove is arranged to extend in a direction normal to a pull direction (also known as tooling direction) of the first and second half. This may be advantageous for achieving a well-defined groove, e.g. a groove having the desired shape.

For example, the first and second half may be defined by a cross section in a vertical plane parallel through a center axis defined by the output shaft line, and the at least one groove may be positioned either in the intersection between the halves or at a position in the middle of each half.

According to one embodiment, the housing is an injection molded plastic housing. The first thread and/or the at least one groove may in such an embodiment be formed in the housing material (and/or in an outer surface of the housing) during injection molding of the plastic housing.

According to one embodiment, an axial extension of the groove is longer than an axial extension of the first thread.

According to one embodiment, the first thread is an external thread and the second thread is an internal thread.

According to one embodiment, the cap nut and the intermediate member are adapted to, in use, be coaxially arranged.

According to one embodiment, the cap nut and the intermediate member are adapted to, in use, be arranged to have at least a partial axial overlap.

According to one embodiment, the engaging structure provided on the intermediate member is a thread. Other solutions, such as a bayonet coupling, are however conceivable within the scope of the present invention.

According to one embodiment, the housing is made of plastic. By plastic should be understood any plastic, polymeric or similar material. In such an embodiment, the first thread may be a plastic thread. In other embodiment, the housing may be made from a composite material, such as a fiber reinforced plastic, cast iron or (die) cast aluminum.

According to one embodiment, the intermediate member and/or the cap nut is/are made of metal, such as aluminum, steel or a steel alloy.

According to one embodiment the power tool is a handheld power tool, such as a pneumatically or electrically powered tool, possibly a battery powered tool. Examples include a tightening tool such as a screw driver of any of the above mentioned types. According to one embodiment, the power tool is a handheld pistol tool.

According to one embodiment, the tool attachment is a crow foot tool attachment. Crow foot attachments are also known as geared front attachments. The invention may be particularly useful when using crow foot attachments due to the high reaction forces arising at the attachment point on the tool for example due to the offset. Other examples of tool attachments include extensions and front gear units.

According to a second aspect of the present invention, an adapter assembly for use with a power tool comprising a housing that at least partly houses a motor and an output shaft drivingly connected to the motor, the output shaft extending in a first axial direction A-A, the housing comprising a connection structure allowing for connecting a tool attachment adapted to be driven by the output shaft to the power tool, the connection structure comprising a first thread is provided, wherein the adapter assembly is adapted to be removably attached to the connection structure for connecting the power tool and the tool attachment, the adapter comprising an intermediate member, the intermediate member comprising an engaging structure for engaging the tool attachment provided on an outer side thereof and a cap nut for locking the intermediate member to the tool housing, the cap nut comprising a second thread for cooperating with the first thread provided at the front end of the housing, wherein the connection structure further comprises a groove extending in a longitudinal direction parallel to the direction A-A, wherein the intermediate member further comprises at least one fin adapted to be received in the groove.

In some embodiments, the adapter assembly may be an adapter assembly for use with a power tool comprising a connection structure arranged at a front end of the housing.

In other embodiment, the adapter may be equally well suited for use with a connection structure provided at any other position of the tool, such as at the back/rear end of the tool or at an upper portion of the tool.

The adapter assembly may in some embodiments be an adapter assembly for fixing the tool, i.e. to provide a fixtured assembly solution or in other embodiments for providing a connection for a tool suspension.

According to a third aspect of the present invention, a kit comprising an adapter assembly and a tool attachment, such as a tool attachment adapter or a crow foot tool attachment, is provided. The kit may in some embodiments further comprise additional tool attachments, such as for example an additional adapter adapted to be arranged between the adapter assembly and the other (first) tool attachment. Examples of such an additional adapter include an adapter for connecting a crow foot tool attachment to the adapter assembly (which in turn is adapted to be connected to the tool housing).

Objectives, advantages and features of conceivable within the respective scopes of the second and third aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
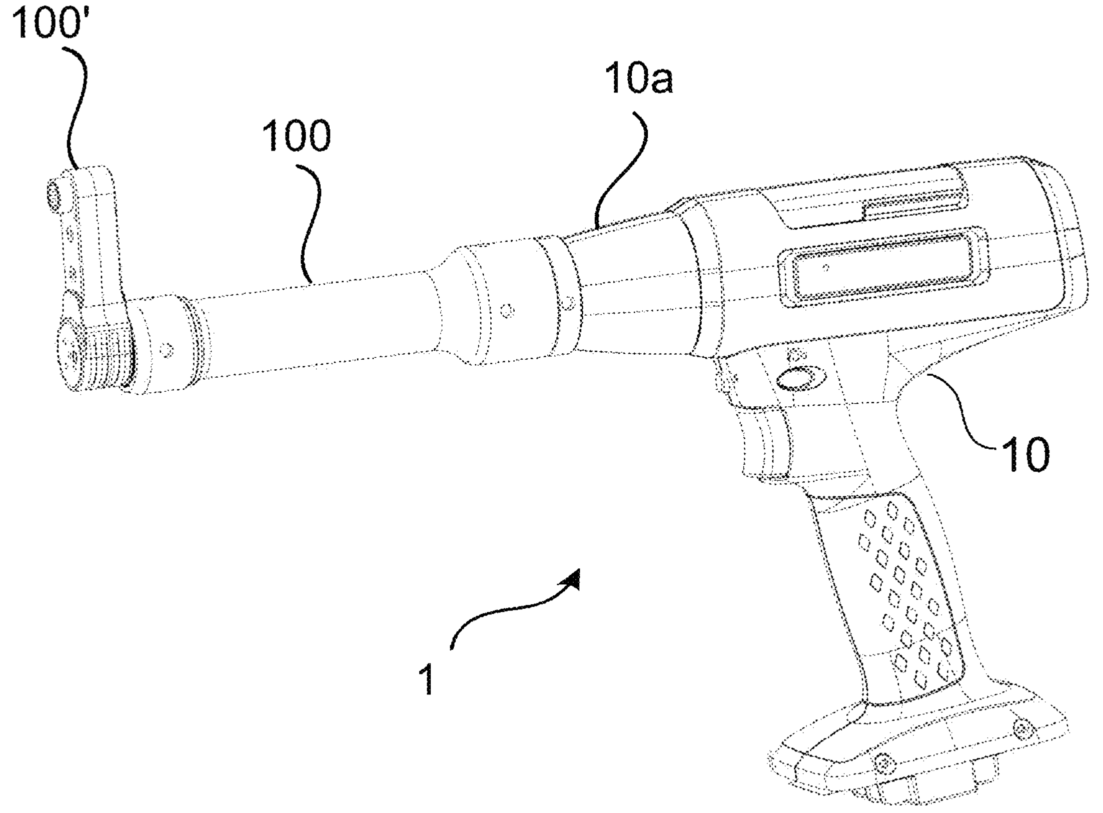
FIG. 1 is a perspective view of an exemplary power tool and a power tool attachment according to one embodiment.

A power tool 1 according to one embodiment, is shown in FIG. 1 in a perspective view. For example, the tool may be a handheld electrical pistol power tool for tightening of threaded fasteners, The tool 1 comprises a housing 10. A tool attachment 100, such as for example an adapter attachment 100 as illustrated in FIG. 1, may be attached to the power tool 1 at a front end 10*a* of the housing 10. The tool attachment 100 is attached to the tool 1 by means of an adapter assembly 20 (not visible in FIG. 1), as will be explained in the following. A second tool attachment 100', such as a crow foot 100', or geared front attachment 100', may be attached to the adapter attachment 100. Such a crow foot 100' may however also be attached directly to the adapter assembly 20.

Figure 2A:
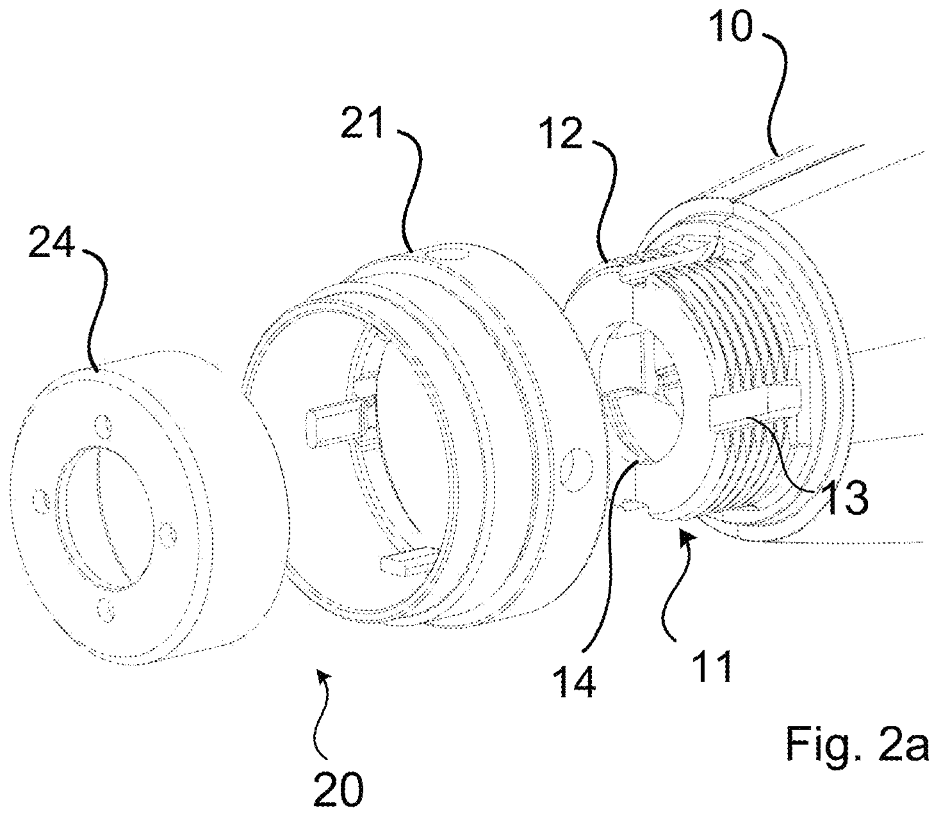
FIG. 2*a* is a perspective exploded view of a front end of an exemplary power tool according to one embodiment.
Figure 2B:
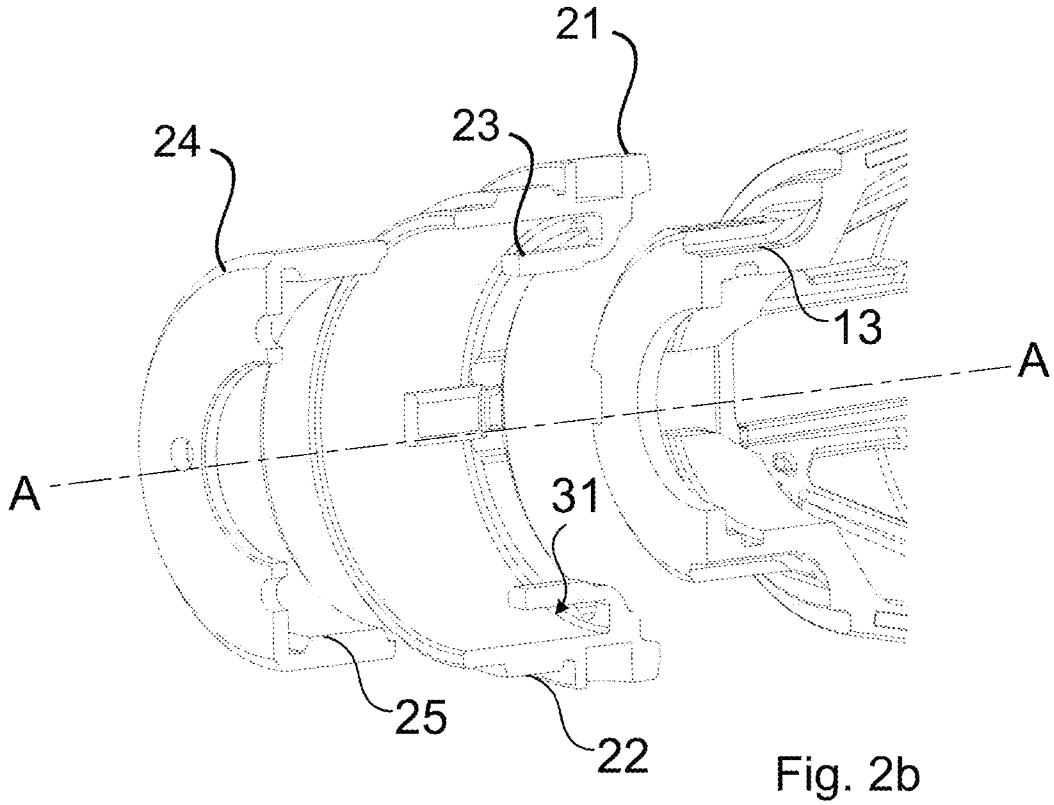
FIG. 2*b* is a perspective view in cross section of a front end of an exemplary power tool according to one embodiment.
Figure 2C:
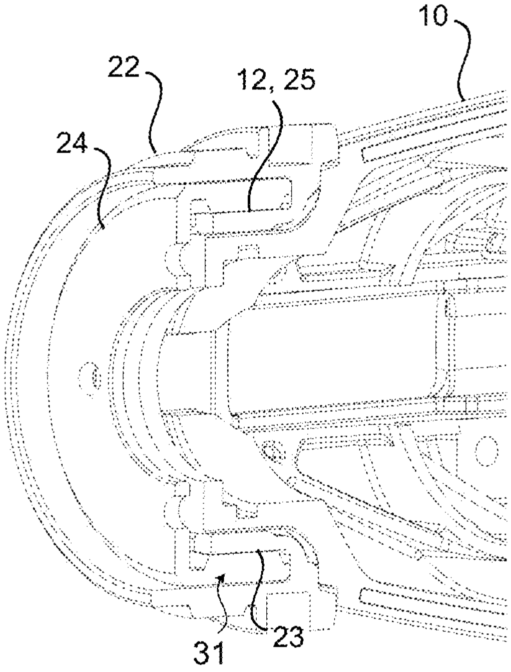
FIG. 2*c* is a perspective view of a front end of an exemplary power tool according to one embodiment.

An example of a front end 10*a* of the housing 10 of the power tool 1 is shown in FIGS. 2*a* and 2*b* in exploded views and FIG. 2*c* in an assembled state.

The housing 10 is adapted to at least partly house a motor and an output shaft (not shown), the output shaft extending in a first axial direction A-A. For example, the housing 10 may be an injection molded plastic housing 10.

The housing 10 comprises a connection structure 11 allowing for connecting a tool attachment adapted to be driven by the output shaft to the power tool 1. The connection structure 11 is arranged at the front end 10*a* of the housing 10 and comprises a first thread 12.

The thread 12 may for example be an external thread and extend around a front opening 14 provided at the front end 10*a* of the housing 10, through which the output shaft will extend. The thread 12 may for example be a plastic thread 12 formed in the injection molded plastic housing 10.

The connection structure 11 further comprises a number of grooves 13, for example four grooves, each extending in a longitudinal direction parallel to the direction A-A and formed in the injection molded plastic housing 10. The grooves 13 may further extend in a manner intersecting the first thread 12 such that the grooves 13 may be said to form longitudinally extending gaps in the thread 12.

The four grooves 13 are equally spaced along a circumference of the connection structure 11 and formed in the housing 10, i.e. in the plastic material of the housing 10. As may be seen for example from FIG. 2*a*, the axial extension of the groove may be slightly longer than the axial extension of the first thread.

The power tool further comprises an adapter assembly 20 adapted to be removably attached to the connection structure 11 for connecting the power tool and the tool attachment (not shown in FIG. 2*a*-2*c*), for example a crow foot tool attachment.

The adapter assembly 20 comprises an intermediate member 21 and a cap nu 24 for locking the intermediate member 21 to the tool housing 10. The cap nut 24 for this purpose comprises a second thread 25 for cooperating with the first thread 12 provided at the front end 10*a* of the housing 10. The intermediate member 21 as well as the cap nut 24 may be made of a metallic material, such as aluminum or a suitable steel alloy.

An engaging structure 22 for engaging the tool attachment is provided on an outer side of the intermediate member 21. The engaging structure 22 may for example be a thread adapted to engage a corresponding thread of the tool attachment. The intermediate member 21 further comprises a number of fins 23, for example four fins 23, adapted to be received in a respective one of the grooves 13 to transfer torque.

Figure 3:
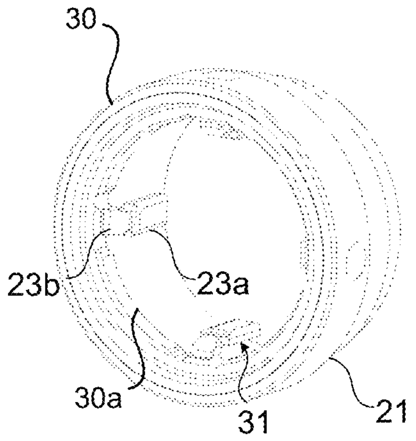
FIG. 3 is a perspective view of an exemplary portion of an adapter assembly according to one embodiment.

An exemplary embodiment of the intermediate member 21, which is shown in detail in FIG. 3, comprises a cylindrical portion 30. The fins 23 may be described as extending in a longitudinal direction parallel to the direction A-A. More particularly, each fin 23 may comprise a respective first axially extending portion 23*a* and a respective second radially extending portion 23*b*, the radially extending portion 23*b* connecting the axially extending portion 23*a* and the and cylindrical portion 30 of the intermediate member 21.

The fins 23 may further extend on an inner side 30*a* of the cylindrical portion 30, such that a gap 31 is formed between the cylindrical portion 30 and the axially extending portions 23*a* of the fins 23.

The cap nut 24 may be adapted to, in use, be arranged in the gap 31 as shown in FIG. 2*c* showing the assembled adapter and tool 1. The cap nut 24 and the intermediate member 21 may further be adapted to, in use, be coaxially arranged and to have at least a partial axial overlap, also shown in FIG. 2*c*.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word “comprising” does not exclude other elements or steps and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A power tool comprising a housing that at least partly houses a motor and an output shaft drivingly connected to said motor said output shaft extending in an axial direction, said housing comprising:

- a connection structure allowing for connecting a tool attachment adapted to be driven by the output shaft to said power tool, said connection structure being arranged at a front end of said housing and comprising a first thread;
- an adapter assembly adapted to be removably attached to said connection structure for connecting said power tool and said tool attachment, said adapter assembly comprising:
  - an intermediate member, said intermediate member comprising an engaging structure for engaging said tool attachment, the engaging structure being provided on an outer side thereof; and
  - a cap nut for locking said intermediate member to said tool housing, said cap nut comprising a second thread for cooperating with said first thread provided at said front end of said housing; and
- a groove extending in a longitudinal direction parallel to said axial direction,
- wherein said intermediate member of said adapter assembly further comprises at least one fin adapted to be received in said groove, and wherein said groove extends in a manner intersecting said first thread such that said groove forms a longitudinally extending gap in said thread.

2. A power tool according to claim 1, wherein said intermediate member comprises a cylindrical portion, and wherein said at least one fin extends on an inner side of the cylindrical portion, such that a gap is formed between the cylindrical portion and at least a portion of the at least one fin.

3. A power tool according to claim 2, wherein said cap nut is adapted to, in use, be arranged in said gap.

4. A power tool according to claim 1, wherein said connection structure is arranged to extend at least partly around a front opening provided at said front end of the housing, through which said output shaft extends.

5. A power tool according to claim 1, wherein said connection structure comprises two grooves.

6. A power tool according to claim 1, wherein said connection structure comprises four grooves, equally spaced along a circumference of the connection structure.

7. A power tool according to claim 1, wherein said intermediate member comprises a plurality of fins, wherein a number of fins of the intermediate member equals a number of grooves of the connection structure.

8. A power tool according to claim 1, wherein the housing is a molded or casted housing comprising a first and a second half, and wherein said at least one groove is arranged to extend in a direction normal to a pull direction of said first and second half.

9. A power tool according to claim 8, wherein the housing is an injection molded plastic housing.

10. A power tool according to claim 1, wherein an axial extension of the groove is longer than an axial extension of the first thread.

11. A power tool according to claim 1, wherein said first thread is an external thread and said second thread is an internal thread.

12. A power tool according to claim 1, wherein said cap nut and said intermediate member are adapted to, in use, be coaxially arranged.

13. A power tool according to claim 1, wherein said cap nut and said intermediate member are adapted to, in use, be arranged to have at least a partial axial overlap.

14. A power tool according to claim 1, wherein said engaging structure provided on said intermediate member is a thread.

15. A power tool according to claim 1, wherein said housing is made of plastic.

16. A power tool according to claim 1, wherein said intermediate member and/or said cap nut are made of metal.

17. A power tool according to claim 1, wherein said first thread and/or said at least one groove are formed in said housing.

18. A power tool according to claim 1, wherein said power tool is a handheld pistol tool.

19. A power tool according to claim 1, wherein said tool attachment is a crow foot tool attachment.

20. An adapter assembly for use with a power tool comprising a housing that at least partly houses a motor and an output shaft drivingly connected to said motor, said output shaft extending in an axial direction, said housing comprising a connection structure allowing for connecting a tool attachment adapted to be driven by the output shaft to said power tool, said connection structure being arranged at a front end of said housing and comprising a first thread, wherein said adapter assembly is adapted to be removably attached to said connection structure for connecting said power tool and said tool attachment, said adapter comprising:

an intermediate member, said intermediate member comprising an engaging structure for engaging said tool attachment provided on an outer side thereof; and a cap nut for locking said intermediate member to said tool housing, said cap nut comprising a second thread for cooperating with said first thread provided at said front end of said housing, wherein said connection structure further comprises a groove extending in a longitudinal direction parallel to said axial direction, wherein said intermediate member further comprises at least one fin adapted to be received in said groove.

21. A kit comprising an adapter assembly according to claim 19 and a tool attachment.

* * * * *